US012565843B2

(12) United States Patent　　(10) Patent No.:　US 12,565,843 B2
Yagihashi et al.　　　　　　　　(45) Date of Patent:　　　Mar. 3, 2026

(54) COMPOSITE BLADE

(71) Applicant: IHI Corporation, Tokyo (JP)

(72) Inventors: Shogo Yagihashi, Tokyo (JP); Atsumu Omae, Tokyo (JP); Toshihiko Hosaka, Tokyo (JP); Takaomi Inada, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 19/186,738

(22) Filed: Apr. 23, 2025

(65) Prior Publication Data

US 2025/0250902 A1　　Aug. 7, 2025

Related U.S. Application Data

(63) Continuation of application No. PCT/JP2023/034728, filed on Sep. 25, 2023.

(30) Foreign Application Priority Data

Jan. 16, 2023　　(JP) ................................ 2023-004398

(51) Int. Cl.
　　*F01D 5/28*　　　　(2006.01)
　　*B32B 1/00*　　　　(2006.01)
　　　　(Continued)
(52) U.S. Cl.
　　CPC ................ *F01D 5/282* (2013.01); *B32B 1/00* (2013.01); *B32B 5/26* (2013.01); *B32B 7/03* (2019.01);
　　　　(Continued)
(58) Field of Classification Search
　　CPC ... F01D 5/282; F01D 5/30; B32B 1/00; B32B 5/26
　　See application file for complete search history.

(56) References Cited

U.S. PATENT DOCUMENTS

| | | | |
|---|---|---|---|
| 3,752,600 | A | 8/1973 | Walsh et al. |
| 4,040,770 | A | 8/1977 | Carlson |

(Continued)

FOREIGN PATENT DOCUMENTS

| | | |
|---|---|---|
| JP | 48-65507 A | 9/1973 |
| JP | 52-80510 A | 7/1977 |

(Continued)

OTHER PUBLICATIONS

International Search Report issued Oct. 31, 2023 in PCT/JP2023/034728 filed on Sep. 25, 2023, 3 pages.

*Primary Examiner* — Michael L Sehn
(74) *Attorney, Agent, or Firm* — Oblon, McClelland, Maier & Neustadt, L.L.P.

(57) ABSTRACT

A composite blade includes: an airfoil section, a root (blade root), and primary laminates and secondary laminates alternately laminated at the root, which respectively include composite material layers. A side surface of the root includes a contactable surface contactable with a mounting groove. The primary laminates extend from the root to the airfoil section to be joined before reaching the airfoil section. The secondary laminates extend from the root to junctions of the primary laminates. The contactable surface has first and second edges. Inside the root, a first area located around the first edge and a second area located between the first area and the center plane of the root are set. End portions of the secondary laminates are not located in the first area. Parts of the primary and secondary laminates are alternately located along the blade thickness direction in at least a part of the second area.

4 Claims, 4 Drawing Sheets

(51) Int. Cl.
    *B32B 5/26*         (2006.01)
    *B32B 7/03*         (2019.01)
    *F01D 5/30*         (2006.01)

(52) U.S. Cl.
    CPC .......... *F01D 5/30* (2013.01); *B32B 2260/023*
        (2013.01); *B32B 2260/046* (2013.01); *B32B*
        *2262/106* (2013.01); *B32B 2603/00* (2013.01);
        *F05D 2300/603* (2013.01)

(56)           References Cited

U.S. PATENT DOCUMENTS

| | | | |
|---|---|---|---|
| 8,100,662 B2 * | 1/2012 | Schreiber ............. | B29C 70/202 |
| | | | 416/248 |
| 8,123,463 B2 * | 2/2012 | Kray ....................... | F01D 5/282 |
| | | | 29/889.6 |
| 8,794,925 B2 | 8/2014 | Mccaffrey | |
| 9,243,512 B1 | 1/2016 | Zatorski et al. | |
| 10,677,075 B2 * | 6/2020 | Weaver ................... | F01D 5/303 |
| 2008/0187441 A1 | 8/2008 | Schreiber | |
| 2016/0200085 A1 | 7/2016 | Zatorski et al. | |
| 2016/0201503 A1 | 7/2016 | Zatorski et al. | |
| 2017/0254212 A1 | 9/2017 | Pautard et al. | |
| 2018/0320706 A1 | 11/2018 | Jain et al. | |
| 2019/0111636 A1 | 4/2019 | Van Nieuwenhove et al. | |
| 2019/0301285 A1 | 10/2019 | Kamiya et al. | |
| 2020/0095873 A1 | 3/2020 | Okabe et al. | |
| 2020/0400027 A1 | 12/2020 | Okabe et al. | |

FOREIGN PATENT DOCUMENTS

| | | | |
|---|---|---|---|
| JP | 2017-528641 A | 9/2017 | |
| JP | 2018-508684 A | 3/2018 | |
| JP | 2018-204460 A | 12/2018 | |
| JP | 2019-173726 A | 10/2019 | |
| JP | 2021-1549 A | 1/2021 | |

* cited by examiner

COMPOSITE BLADE

CROSS REFERENCE TO RELATED APPLICATIONS

This application is a continuation application of International Application No. PCT/JP2023/034728, now WO 2024/154386 A1, filed on Sep. 25, 2023, which claims priority to Japanese Patent Application No. 2023-004398, filed on Jan. 16, 2023, the entire contents of which are incorporated by reference herein.

TECHNICAL FIELD

This disclosure relates to composite blade.

BACKGROUND ART

Reduction of fuel consumption rate in jet engines is a permanent issue. Against this issue, turbofan engines have been designed to increase the fan diameter to achieve high bypass ratio. However, as the bypass ratio increases, the fan blade becomes larger, which increases the weight of the engine. Therefore, it is required to reduce the weight of fan blades while having high resilience.

A composite blade is a blade including composite material layers of reinforced fiber resin laminated to each other. Carbon fiber reinforced resin (CFRP), which uses carbon fiber as its fiber, has attracted attention as a material that can promote weight reduction while giving high resilience to fan blades. In this regard, JP 2019-173726 A (Patent Literature) discloses a composite blade developed to suppress strength degradation of the blade root.

SUMMARY OF THE INVENTION

A blade root (dovetail) of a composite blade is formed by interposing a short composite material layer between composite material layers (main plies) continuing from the blade surface. When a foreign object (so-called FOD) such as a bird strike collides with a blade, local stress due to the collision is generated in the blade root and its vicinity. When the generated stress is excessively large, damage such as delamination occurs.

The present disclosure has been made in view of the above-mentioned circumstances, and an object of the present disclosure is to provide a composite blade capable of suppressing the occurrence of damage such as delamination due to the collision of foreign objects.

A composite blade according to one embodiment of the present disclosure includes: an airfoil section; a blade root provided at one end of the airfoil section; and primary laminates and secondary laminates alternately laminated in a blade thickness direction of the composite blade at the blade root, the primary and secondary laminates including a plurality of composite material layers formed of reinforced fiber resin and laminated to each other; wherein the blade root includes a side surface including a contactable surface being contactable with a mounting groove for the blade root; the primary laminates extend from the blade root to the airfoil section to be before until reaching the airfoil section; the secondary laminates extend from the blade root to junctions of the primary laminates; the contactable surface has a first edge and a second edge extending in a longitudinal direction of the blade root with a distance in a span direction of the composite blade, the first edge being closer to the airfoil section than the second edge; a first area and a second area is set inside the blade root, the first area being positioned around the first edge of the contactable surface and the second area being positioned between the first area and a center plane of the blade root, end portions of the secondary laminates are not located in the first area, and parts of the primary laminates and parts of the secondary laminates are alternately positioned along the blade thickness direction in at least a part of the second area.

The first area may have a predetermined length along the span direction and a predetermined depth toward the center plane of the blade root. When a length from the first edge to the second edge along the span direction is referred to as a reference length, the predetermined length of the first area may be set to a sum of a length of at least 25% or more of the reference length from the first edge to the second edge and a length of at least 110% or more of the reference length from the first edge to the airfoil section, and the predetermined depth of the first area may be set to 20% or more of a minimum width of a neck portion where the airfoil section and the blade root are connected.

Fibers constituting the reinforced fiber resin may be unidirectional carbon fibers. At least one of the secondary laminates may be located outermost from a central plane of the blade root in the arrangement of the secondary laminates and the primary laminates in the blade thickness direction. The side surface of the blade root may be formed as an inclined surface extending to be away from the central plane of the blade root as it approaches a base end of the composite blade.

According to the present disclosure, it is possible to provide a composite blade capable of suppressing the occurrence of damage such as delamination due to the collision of foreign matter.

DESCRIPTION OF EMBODIMENTS

Figure 1:
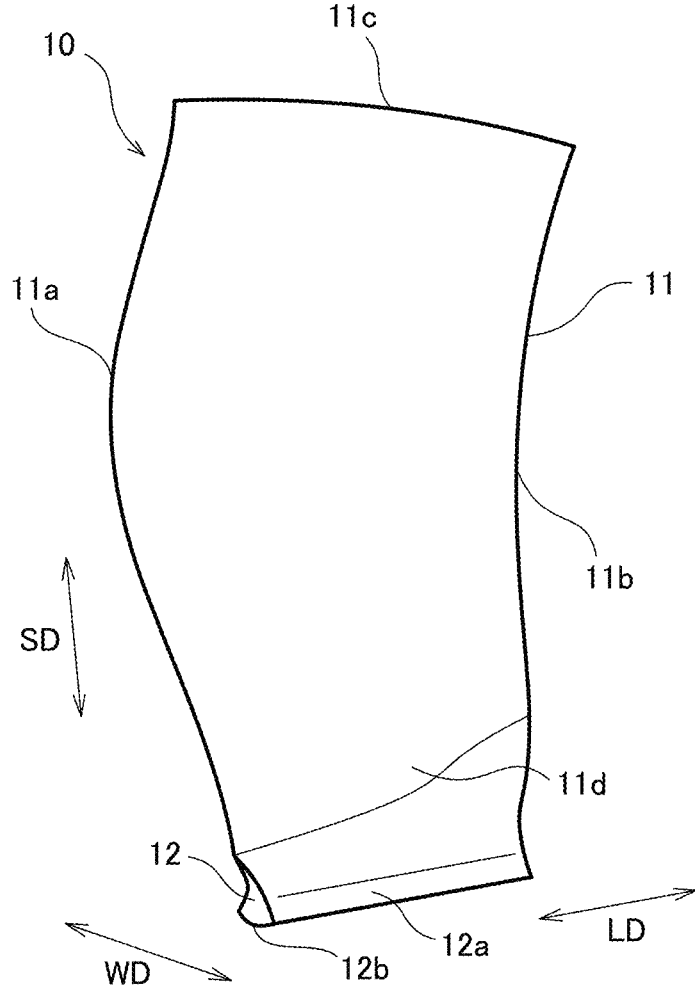
FIG. 1 is a perspective view of a fan blade that is an example of a composite blade according to an embodiment of the present disclosure.

A composite blade according to an embodiment of the present disclosure will be described below with reference to the drawings. In each of the drawings, common parts are given the same reference numerals and duplicated explanations will be omitted. For convenience of explanation, a fan blade 10 is given as an example of the composite blade according to the present embodiment. The fan blade 10 is used in an aircraft engine such as a turbofan engine (not shown).

Figure 2:
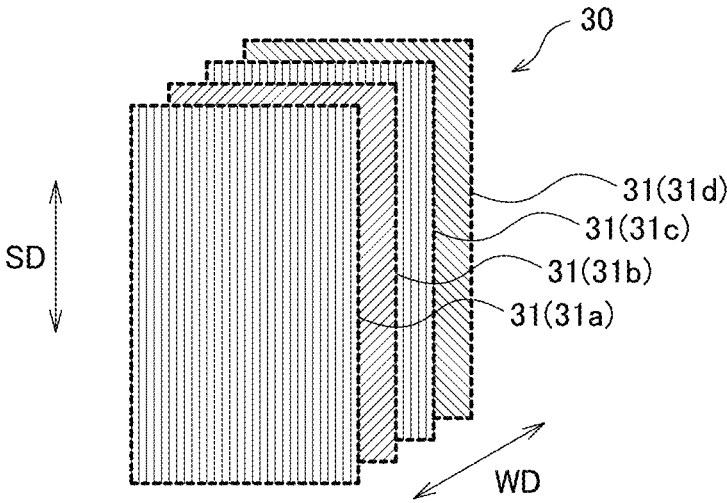
FIG. 2 is a view showing an example of a plurality of composite material layers constituting a laminate according to an embodiment of the present disclosure.
Figure 3A:
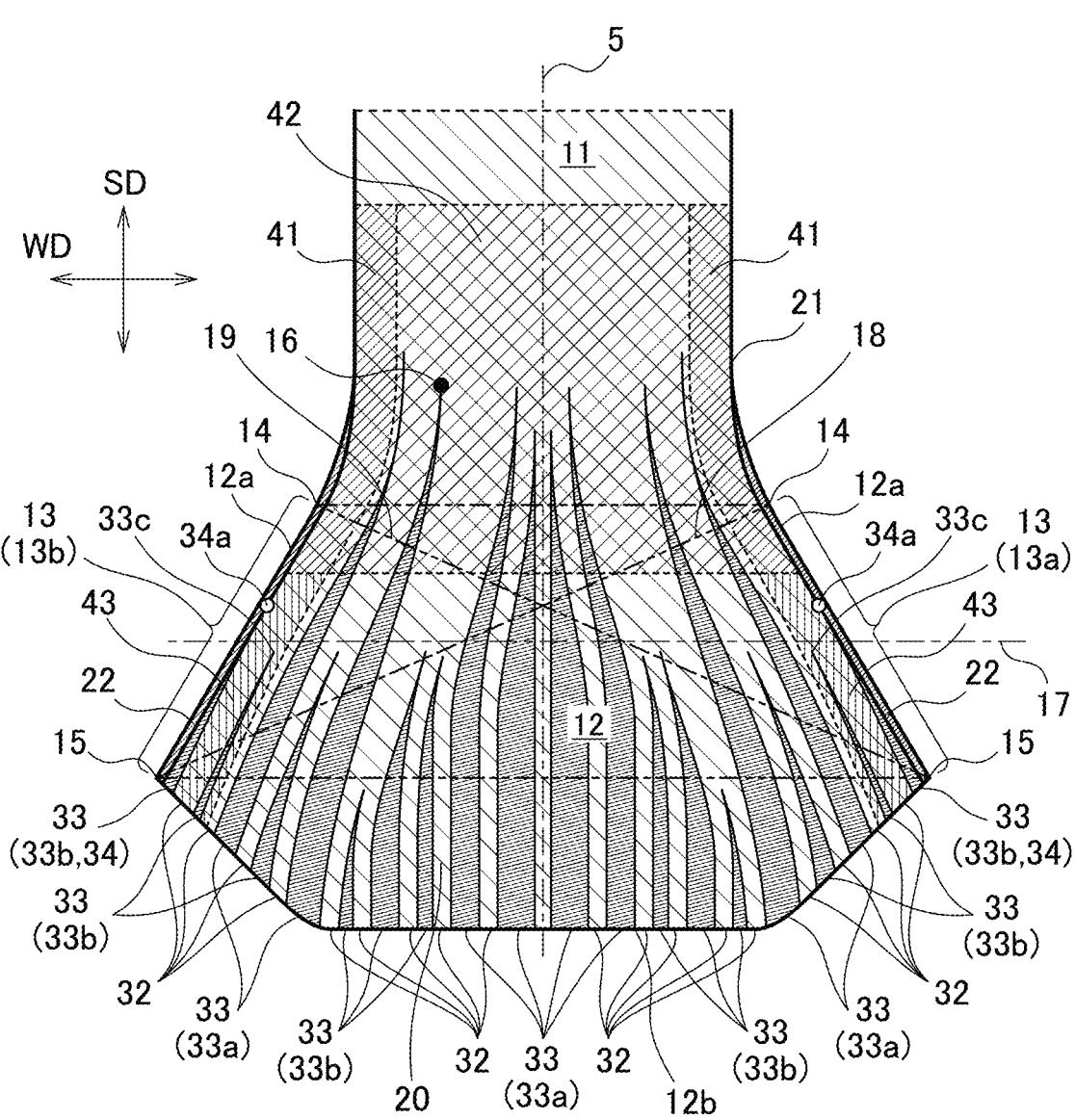
FIG. 3A is a cross-sectional view of a blade root and its surroundings according to an embodiment of the present disclosure.
Figure 3B:
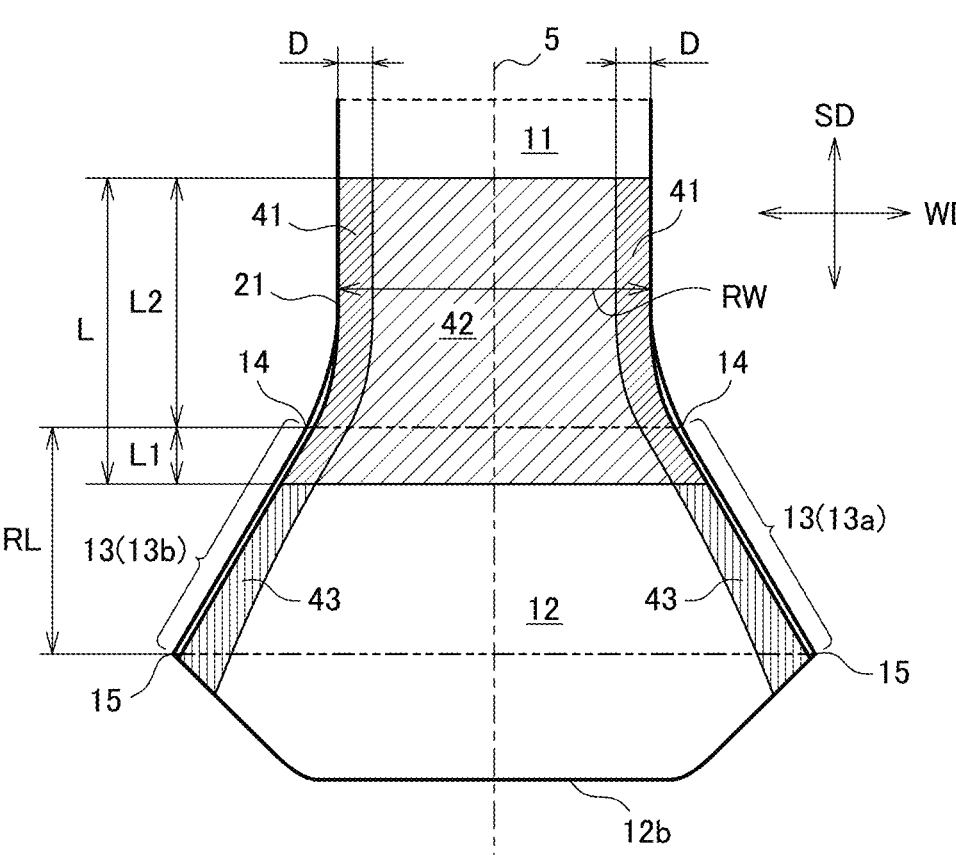
FIG. 3B is a cross-sectional view showing the first, second, and third areas in the cross-sectional view shown in FIG. 3A.
Figure 4:
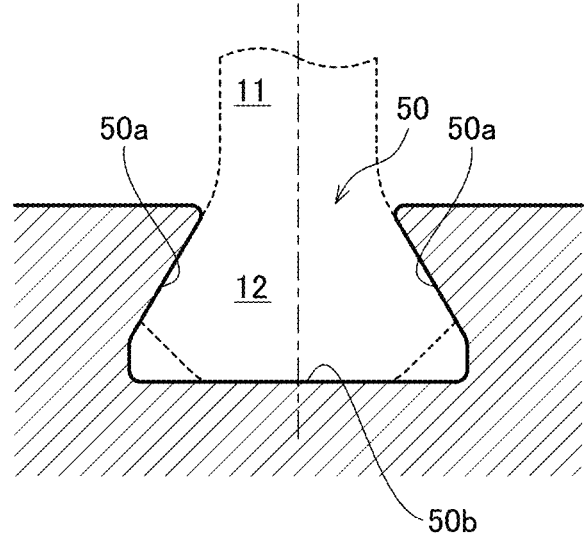
FIG. 4 is a cross-sectional view of a mounting groove of a fan blade shown in FIG. 1.
Figure 5A:
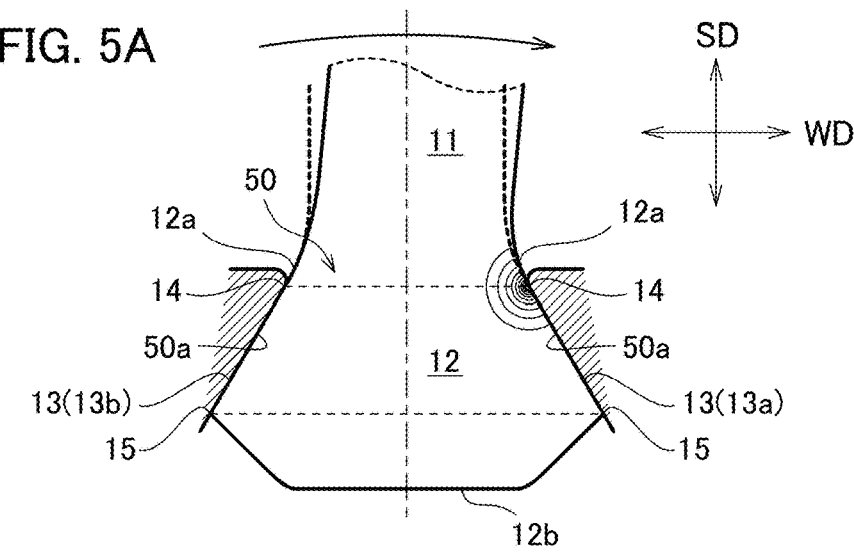
FIG. 5A is a cross-sectional view showing local stresses in a blade root caused by an impact of a foreign object.
Figure 5B:
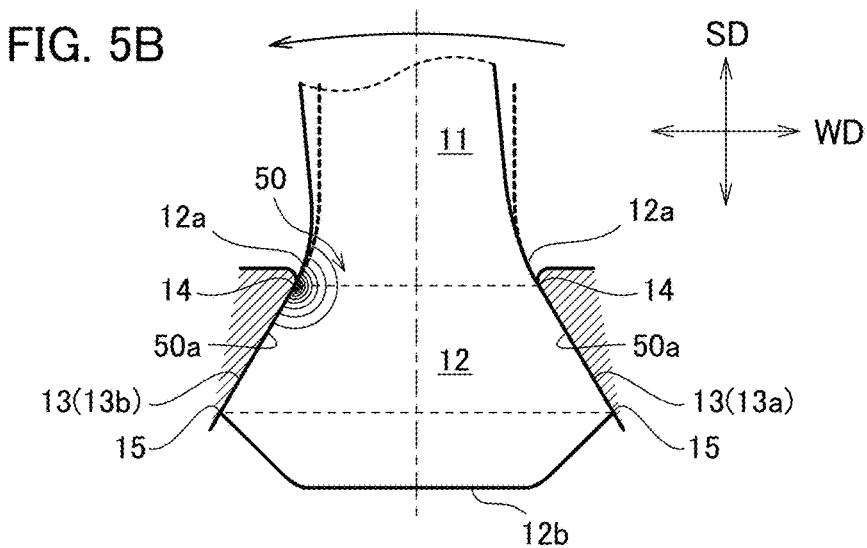
FIG. 5B is a cross-sectional view showing local stresses in a blade root caused by an impact of a foreign object.
Figure 5C:
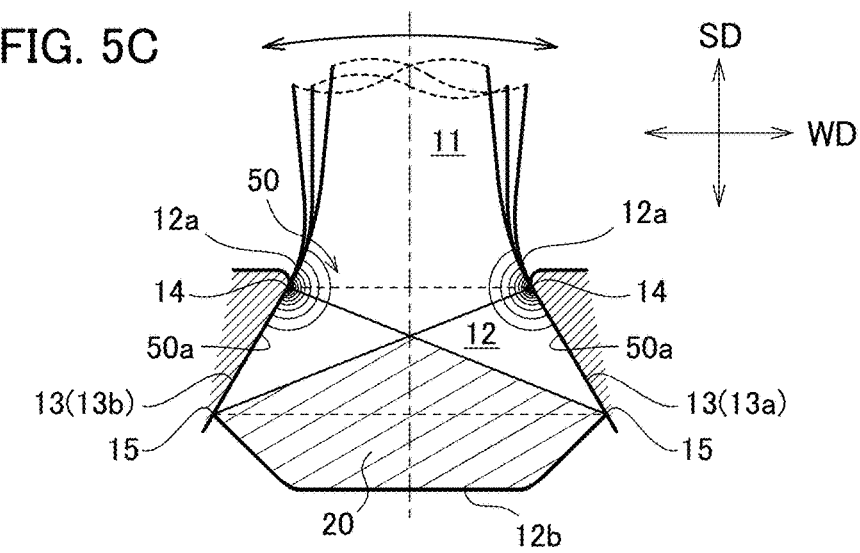
FIG. 5C is a cross-sectional view showing local stresses in a blade root caused by an impact of a foreign object.

FIG. 1 is a perspective view of the fan blade 10. FIG. 2 is a view showing an example of a plurality of composite material layers 31 constituting a laminate 30. FIG. 3A is a cross-sectional view of a blade root 12 of the fan blade 10 and its surroundings. FIG. 3B shows a first area 41, a second area 42, and a third area 43 in the cross section shown in FIG. 3A. FIG. 4 is a cross-sectional view of the mounting groove 50 of the fan blade 10. FIGS. 5A to 5C are cross-sectional views showing the local stress generated in the blade root 12 by the collision of a foreign object or the like. The cross sections shown in FIGS. 3A to 5C are orthogonal to an extending direction (i.e., longitudinal direction LD) of the blade root 12.

As shown in FIG. 1, the fan blade 10 includes an airfoil section 11 provided on the tip-end side of the fan blade 10 and a blade root 12 provided on the base-end side of the fan blade 10. The airfoil section 11 and the blade root 12 are integrally formed of a plurality of composite material layers 31 described later. The airfoil section 11 has a leading edge 11a, a trailing edge 11b, a tip 11c, and a hub 11d. The airfoil section 11 extends from the hub 11d as one end thereof to the tip 11c as the other end thereof in the span direction SD of the fan blade 10.

The blade root 12 is connected to the hub 11d of the airfoil section 11. The blade root 12 extends in the longitudinal direction LD and fits into the mounting groove 50 (see FIG. 3) of the rotor (not shown) to which the fan blade 10 is attached. Details of the blade root 12 will be described later.

As shown in FIG. 2, the main structural material of the fan blade 10 is a plurality of composite material layers 31 formed of reinforced fiber resin. The composite material layer 31 is composed of reinforced fibers impregnated with resin. The resin constituting the reinforced fiber resin is a thermosetting resin or a thermoplastic resin. The thermosetting resin is an epoxy resin, phenol resin, or a polyimide resin. The thermoplastic resin is polyetheretherketone or polyphenylene sulfide. However, the components of the resin are not limited to the above-mentioned substances. On the other hand, the fibers constituting the reinforced fiber resin are carbon fibers, which are arranged parallel to each other in a predetermined direction. In other words, the fibers constituting the reinforced fiber resin are unidirectional carbon fibers. However, the fibers constituting the reinforced fiber resin are not limited to carbon fibers as long as they have the same mechanical strength and flexibility as carbon fibers.

The plurality of composite material layers 31 are alternately laminated in the blade thickness direction WD to constitute a single laminate (ply) 30 formed as the primary laminate 32 or the secondary laminate 33 shown in FIG. 3A. In forming the laminate 30, the plurality of composite material layers 31 are laminated while periodically changing the orientation angle of their fibers. The orientation angle of the fibers represents an extending direction of the fibers with respect to the span direction SD. For example, as shown in FIG. 2, the orientation angles of the four composite material layers 31a, 31b, 31c, and 31d, which are laminated, are 0°, −45°, 0°, and 45°, respectively. As described above, by laminating the composite material layers having positive and negative orientation angles with the same absolute value (in this case, the composite material layer 31b and the composite material layer 31d), the cross-elasticity effect that occurs in each layer can be canceled.

The blade root 12 will now be described.

As shown in FIG. 3A, when viewed from the longitudinal LD, the blade root 12 has a substantially triangular cross-section with its apex directed toward the airfoil section 11. In other words, the blade root 12 has a substantially trapezoidal cross-section with the upper base (short base) directed toward the airfoil section 11. The blade root 12 has a bottom surface 12b and a pair of side surfaces 12a and 12a, which form the above-described cross-section. The bottom surface 12b is located at the base end of the fan blade 10. The bottom surface 12b may be covered with a metal protector (not shown). The protector (not shown) covers and protects the end surfaces of the primary laminates 32 and the secondary laminates 33, which form the bottom surface 12b.

Each side surface 12a is formed as an inclined surface extending to be away from a center plane 5 of the blade root 12 as it approaches the base end (in other words, the bottom surface 12b) of the fan blade 10. Each side surface 12a is formed of a composite material layer 22 and includes a contactable surface 13 that can contact with a side surface 50a of the mounting groove 50. The reinforcing fibers constituting the composite material layer 22 are, for example, glass fibers or carbon fibers. However, as long as the performance required for the composite material layer 22 is satisfied, the reinforcing fibers of the composite material layer 22 are not limited thereto. A protective material (not shown) may be attached to the side surface 12a. The protective material suppresses excessive wear of the side surface 12a of the fan blade 10 and the side surface 50a of the mounting groove 50.

The contactable surface 13 has a first edge 14 and a second edge 15 both of which extends in the longitudinal direction LD of the blade root 12 with a distance in the span direction SD. The first edge 14 is closer to the airfoil section 11 than the second edge 15.

The side surface 12a of the blade root 12 extends closer to the airfoil section 11 than the first edge 14. Therefore, the first edge 14 does not have a discontinuous structure such as a step. The side surface 12a of the blade root 12 may extend closer to the bottom surface 12b than the second edge 15, or may be located at a boundary between the contactable surface 13 (side surface 12a) and the bottom surface 12b. In the former case, like the first edge 14, the second edge 15 does not have a discontinuous structure such as a step. In the latter case, the second edge 15 is formed as a corner of the contactable surface 13 (side surface 12a). The shape of the second edge 15 depends on the shape and size of the side surface 50a (see FIG. 4) of the mounting groove 50.

As shown in FIG. 3A, the blade root 12 is provided with primary laminates (main plies) 32 and secondary laminates (filler) 33, each of which is formed as the above-described laminate 30. In the blade root 12, the primary laminates 32 and the secondary laminates 33 are alternately laminated in the blade thickness direction WD to form most of the above-described cross-sectional shape. The number of laminated composite material layers may be different or equal among the primary laminates 32. This selection depends on the size of the cross-sectional shape of the blade root 12. This also applies to the secondary laminate 33.

The primary laminates 32 extend from the blade root 12 to the airfoil section 11. For example, the primary laminates 32 extend from the bottom surface 12b of the blade root 12 to the tip 11c of the airfoil section 11. The primary laminates 32 are the main structural materials of the airfoil section 11. Therefore, the primary laminates 32 are joined (merge) before (until) reaching the airfoil section 11, and are laminated and integrated with each other at the airfoil section 11.

The secondary laminates 33 extend from the bottom surface 12b of the blade root 12 to respective junctions 16 of the primary laminates 32. FIG. 3A illustrates one of the plurality of junctions 16 with a black circle, as one example. The secondary laminate 33 is provided between the two primary laminates 32 adjacent to each other in the blade thickness direction WD, and provides a desired thickness to the blade root 12. The length of the composite material layer 31 constituting each secondary laminate 33 (i.e., the length from the bottom surface 12b toward the junction 16) is adjusted so that the thickness of the end (tip end) of the secondary laminate 33 leading to the junction 16 gradually decreases.

As shown in FIGS. 3A and 3B, a first area 41 and a second area 42 are set inside the blade root 12. The first area 41 is located around the first edge 14 of the contactable surface 13. The second area 42 is located between the first area 41 and the center plane 5 of the blade root 12.

As shown in FIG. 3B, the first area 41 has, for example, a length L along the span direction SD and a depth D toward the center plane 5 of the blade root 12. The length L of the first area 41 is set to be the sum of the length L1 of at least 25% or more of a reference length RL from the first edge 14 to the second edge 15 and the length L2 of at least 110% or more of the reference length RL from the first edge 14 to the airfoil section 11. Here, the reference length RL is the length from the first edge 14 to the second edge 15 along the span direction SD. The depth D of the first area 41 is set to be 20% or more of the minimum width RW of the neck portion 21 where the airfoil section 11 and the blade root 12 are connected.

The above values are set based on the results of strength tests using test bodies having the blade root with the same shape as the blade root 12 and varying the length and arrangement of the secondary laminates 33. In this strength test, a load increasing stepwise is applied to a test body attached to the mounting groove 50. The load applied to the test body is a tensile load corresponding to the centrifugal force when the test body rotates around the rotor, and a load corresponding to a bending load caused by the collision of a foreign object. These loads cause excessive stress in a part corresponding to the blade root 12 and the neck portion 21 (referred to as the corresponding part for convenience), and at some point, delamination or cracking through the laminate occurs. According to this strength test, when the end of the secondary laminate 33 exists in a region of the corresponding part where the stress due to the bending load is relatively high, the delamination or cracking described above occurs even at a relatively low tensile load. In other words, this test result reveals that delamination or cracking can be suppressed by not placing the end of the secondary laminate 33 in the region where the stress is relatively high. In the present embodiment, this region corresponds to the first area 41 described above. Therefore, as shown in FIG. 3A, the ends (tip ends, ends on the airfoil section 11 side) of the secondary laminates 33 are not located in the first area 41. In other words, the first area 41 is occupied by the primary laminates 32 or by the primary laminate 32 and the secondary laminate 33 both of which pass through the area.

The first area 41 will be described focusing on, for example, the side filler 34. The side filler 34 is one of the secondary laminates 33. The side filler 34 is located outermost with respect to the center plane 5 of the blade root 12 in the arrangement of the primary laminates 32 and the secondary laminates 33. In other words, the side filler 34 is the secondary laminate located outermost in the assembly of the primary laminates 32 and the secondary laminates 33.

The side filler 34 is provided on at least one of both sides of the center plane 5. In the example shown in FIG. 3A, the side filler 34 is provided on both sides of the center plane 5. By providing the side filler 34, it is possible to protect the primary laminates 32 when manufacturing the fan blade 10 with machining processes. In addition, when a crack occurs during engine operation, it is also possible to prevent the crack from spreading to the primary laminates 32. Furthermore, since the radius of curvature of the primary laminate 32 in the neck portion 21 is slightly larger than that when the side filler 34 is not provided, it is also possible to expect stress relief in the neck portion 21.

As described above, the ends portion of the secondary laminates 33 are not located in the first area 41. Therefore, the end portion 34a of the side filler 34, which is indicated by a white circle, is located closer to the base-end side of the fan blade 10 (i.e., the bottom surface 12b of the blade root 12) than the first area 41 (see FIG. 3A). That is, when defining a third area 43 which is located closer to the base end of the fan blade 10 along the contactable surface 13 than the first area 41, primary laminates 32 and the secondary laminates 33 including the side filler 34 are provided in the third area 43, but only the secondary laminates 33 are not extended to the first area 41. Here, the third area 43 has the same depth as that of the first area 41 along the blade thickness direction WD.

The end 33c of the secondary laminate 33 such as the side filler 34, which is provided in the third area 43, may be located closer to the airfoil section 11 than the first area 41. That is, both the primary laminates 32 and the secondary laminates 33 in the third area 43 may pass through the first area 41 toward the airfoil section 11.

In at least a part of the second area 42, parts of the primary laminates 32 and parts of the secondary laminates 33 are alternately located along the blade thickness direction WD. That is, between the first area 41 and the center plane 5, at least two secondary laminates 33 are provided between the primary laminates 32. In the second area 42, the secondary laminates 33 are not concentrated in one place, but are scattered in the blade thickness direction. By extending some of the secondary laminates 33 to the second area 42, the number of the primary laminate 32 can be reduced, and the width required for the neck portion 21, at which the airfoil section 11 and the blade root 12 are connected, can be secured.

The blade root 12 is attached to the mounting groove 50 shown in FIG. 4. The mounting groove 50 is formed on the outer surface of the rotor (not shown) and has at least a pair of side surfaces 50a, 50a and a bottom surface 50b. The pair of side surfaces 50a, 50a extend to the longitudinal LD of the blade root 12 with a distance from each other and are connected to each other via the bottom surface 12b. The mounting groove 50 has a cross section complementary to the cross section of the blade root 12. Accordingly, the pair of side surfaces 50a, 50a are provided in parallel with the pair of side surfaces 12a, 12a provided on the blade root 12 and contact the respective contactable surfaces 13.

When the rotor (not shown) rotates with the blade root 12 attached to the mounting groove 50, centrifugal force directed from the blade root 12 toward the airfoil section 11 is generated in the fan blade 10, and the degree of close contact between the side surface 50a of the mounting groove 50 and the contactable surfaces 13 of the blade root 12 is increased.

When a foreign object such as a bird collides with the blade root 12 while the rotor is rotating, the airfoil section 11 bends to one side of the blade thickness direction WD. As an example, FIG. 5A shows a state where the airfoil section 11 is deflected to the right. At this time, the pressure at the first edge 14 of the right contactable surface 13 and the pressure at the second edge 15 of the left contactable surface 13 increase. On the other hand, the pressure at the second edge 15 of the right contactable surface 13 and the pressure at the first edge 14 of the left contactable surface 13 decrease. Then, the interlaminar shear stress rapidly increases near the first edge 14 of the right contactable surface 13.

When the airfoil section 11 deflects to the left as shown in FIG. 5B, the pressure distribution, which is opposite to that of the airfoil section 11 deflected to the right as shown in FIG. 5A, is generated. As a result, the interlaminar shear stress rapidly increases near the first edge 14 of the left contactable surface 13. The airfoil section 11 deflects to the left and right due to the collision of the foreign object. Therefore, when the foreign object collides, the interlaminar shear stress rapidly increases near the first edge 14 on the right and left sides, and thus delamination (i.e., cracks along the composite material layer 31) is likely to occur. The delamination inside the laminate is likely to occur in the region where the edge of the layer is located.

However, inside the blade root 12 according to the present embodiment, a first area 41 is set around the first edge 14, and no end portion of any laminate exists in the first area 41. That is, no end portion of the laminate exists in the area where the shear stress inducing delamination is likely to increase. Therefore, it is possible to suppress the occurrence of damage such as delamination and cracking between laminates.

The secondary laminates 33 may have lengths that can be classified into first secondary laminates 33a and second secondary laminates 33b. The first secondary laminates 33a are relatively long among all of them. The second secondary laminates 33b are relatively short (that is, shorter than any of the first secondary laminates). In the present embodiment, parts of the first secondary laminate 33a and parts of the second secondary laminate 33b are alternately arranged along the blade thickness direction WD.

As shown in FIG. 3A, the second secondary laminate 33b may be located closer to the bottom surface 12b than the intermediate line 17 located between the first edge 14 and the second edge 15 parallel to the blade thickness direction WD. In this case, most or all of the second secondary laminates 33b are located within the region 20 (see FIG. 5C) surrounded by the bottom surface 12b, the line segment 18, and the line segment 19. The line segment 18 is a straight line connecting the first edge 14 of the contactable surface 13a and the second edge 15 of the contactable surface 13b. Similarly, the line segment 19 is a straight line connecting the first edge 14 of the contactable surface 13b and the second edge 15 of the contactable surface 13a. The contactable surface 13a is one (e.g., the right side one in FIG. 3A) of two contactable surfaces 13 provided on both sides of the center plane 5, and the contactable surface 13b is the other (e.g., the left side one in FIG. 3A) of the two.

FIG. 5C is a view showing the line segment 18, the line segment 19, and the region 20, with overlapping FIGS. 5A and 5B. Most of the second secondary laminates 33b are located within the region 20. In this region, compressive stress is generated when the blade root 12 deflects in the span direction SD. However, this compressive stress is unlikely to induce delamination. Accordingly, the delamination within the region 20 is suppressed, although the ends of the second secondary laminates 33b exist in the region 20.

It should be noted that the present disclosure is not limited to the above-described embodiments, but is shown by the description of the claims, and further includes the meaning of the description of the claims and all changes within the scope.

What is claimed is:

1. A composite blade comprising:
an airfoil section;
a blade root provided at one end of the airfoil section; and
primary laminates and secondary laminates alternately laminated in a blade thickness direction of the composite blade at the blade root, the primary and the secondary laminates including a plurality of composite material layers formed of reinforced fiber resin and laminated to each other, wherein
the blade root includes a side surface including a contactable surface being contactable with a mounting groove for the blade root,
the primary laminates extend from the blade root to the airfoil section to be joined before reaching the airfoil section,
the secondary laminates extend from the blade root to junctions of the primary laminates,
the contactable surface has a first edge and a second edge extending in a longitudinal direction of the blade root with a distance in a span direction of the composite blade, the first edge being closer to the airfoil section than the second edge,
a first area and a second area are set inside the blade root, the first area being positioned around the first edge of the contactable surface and the second area being positioned between the first area and a center plane of the blade root,
end portions of the secondary laminates are not located in the first area,
parts of the primary laminates and parts of the secondary laminates are alternately positioned along the blade thickness direction in at least a part of the second area,
the first area has a predetermined length along the span direction and a predetermined depth toward the center plane of the blade root,
when a length from the first edge to the second edge along the span direction is referred to as a reference length, the predetermined length of the first area is set to a sum of a length of at least 25% or more of the reference length from the first edge to the second edge and a length of at least 110% or more of the reference length from the first edge to the airfoil section, and
the predetermined depth of the first area is set to 20% or more of a minimum width of a neck portion where the airfoil section and the blade root are connected.

2. The composite blade according to claim 1, wherein fibers constituting the reinforced fiber resin are unidirectional carbon fibers.

3. The composite blade according to claim 1, wherein at least one of the secondary laminates is located outermost from the center plane of the blade root in an arrangement of the secondary laminates and the primary laminates in the blade thickness direction.

4. The composite blade according to claim 1, wherein the side surface of the blade root is formed as an inclined surface extending to be away from the center plane of the blade root as it approaches a base end of the composite blade.

* * * * *